(12) United States Patent
Nakanishi

(10) Patent No.: US 9,570,836 B2
(45) Date of Patent: Feb. 14, 2017

(54) CONNECTOR, ELECTRICAL CONNECTION BOX AND CONNECTOR MANUFACTURING METHOD

(75) Inventor: Ryuji Nakanishi, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 285 days.

(21) Appl. No.: 13/809,182

(22) PCT Filed: Jul. 8, 2011

(86) PCT No.: PCT/JP2011/065656
§ 371 (c)(1),
(2), (4) Date: Jan. 9, 2013

(87) PCT Pub. No.: WO2012/011395
PCT Pub. Date: Jan. 26, 2012

(65) Prior Publication Data
US 2013/0109203 A1 May 2, 2013

(30) Foreign Application Priority Data
Jul. 21, 2010 (JP) .................................. 2010-163975

(51) Int. Cl.
*H01R 13/502* (2006.01)
*B29C 45/16* (2006.01)
(Continued)

(52) U.S. Cl.
CPC ......... *H01R 13/502* (2013.01); *B29C 45/1671* (2013.01); *H01R 12/724* (2013.01);
(Continued)

(58) Field of Classification Search
CPC .............................. H01R 23/72; H01R 13/502
(Continued)

(56) References Cited

U.S. PATENT DOCUMENTS 6,045,372 A 4/2000 Lian et al.
6,527,989 B1* 3/2003 Onoda .............. B29C 45/14065
174/60

(Continued)

FOREIGN PATENT DOCUMENTS

JP 6-111865 4/1994
JP 2005-007715 1/2005
(Continued)

OTHER PUBLICATIONS

International Search Report of Oct. 4, 2011.
Written Opinion of Oct. 10, 2011.

*Primary Examiner* — Amy Cohen Johnson
*Assistant Examiner* — Matthew T Dzierzynski
(74) *Attorney, Agent, or Firm* — Gerald E. Hespos; Michael J. Porco; Matthew T. Hespos

(57) ABSTRACT

In a connector (23), a substantially L-shaped terminal fitting (21) is mounted in a connector housing (25). The terminal fitting (21) includes a first projecting portion (39) projecting backward from a back wall (38) of a receptacle (27) and a second projecting portion (41) bent downward substantially at a right angle from an end of the first projecting portion (39) and to be connected to a circuit board (14). The connector housing (25) is integrally formed with a protection wall (42) extending backward from the back wall (38) of the receptacle (27) and configured to cover the first and second projecting portions (39, 41) from an upper side, opposite lateral sides and a rear side with clearances formed between the protection wall (42) and both the first and second projecting portions (39, 41).

5 Claims, 9 Drawing Sheets

(51) Int. Cl.
*H01R 12/72* (2011.01)
*H01R 43/16* (2006.01)
*H01R 43/18* (2006.01)
*H01R 43/24* (2006.01)
*H01R 12/50* (2011.01)
*B29C 45/14* (2006.01)
*B29L 31/34* (2006.01)

(52) U.S. Cl.
CPC ............. *H01R 23/72* (2013.01); *H01R 43/16* (2013.01); *H01R 43/18* (2013.01); *H01R 43/24* (2013.01); *B29C 45/1418* (2013.01); *B29C 45/14639* (2013.01); *B29L 2031/3406* (2013.01)

(58) Field of Classification Search
USPC ............................. 439/65, 494, 493, 620.12, 620.14,439/620.16, 620.22
See application file for complete search history.

(56) References Cited

U.S. PATENT DOCUMENTS

| | | | |
|---|---|---|---|
| 7,278,862 B2* | 10/2007 | Nagashima et al. | 439/79 |
| 7,978,459 B2 | 7/2011 | Nakanishi et al. | |
| 8,118,583 B2* | 2/2012 | Nagashima et al. | 425/330 |
| 8,210,873 B2* | 7/2012 | Chikusa | 439/595 |
| 2005/0020104 A1* | 1/2005 | Yamamoto et al. | 439/76.1 |
| 2007/0164475 A1* | 7/2007 | Nagashima et al. | 264/259 |
| 2008/0012173 A1* | 1/2008 | Asao | 264/255 |
| 2009/0298311 A1* | 12/2009 | Nakanishi et al. | 439/76.2 |
| 2010/0203768 A1* | 8/2010 | Kondo | H01R 13/6474 439/676 |
| 2010/0297864 A1* | 11/2010 | Matsuoka | B29C 45/14639 439/271 |

FOREIGN PATENT DOCUMENTS

| | | |
|---|---|---|
| JP | 2007-190777 | 8/2007 |
| JP | 2009-291043 | 12/2009 |
| JP | 2010-081688 | 4/2010 |

\* cited by examiner

CONNECTOR, ELECTRICAL CONNECTION BOX AND CONNECTOR MANUFACTURING METHOD

BACKGROUND OF THE INVENTION

1. Field of the Invention

The present invention relates to a connector, an electrical connection box and a connector manufacturing method.

2. Description of the Related Art

Conventionally, an electrical connection box disclosed in Japanese Unexamined Patent Publication No. 2010-81688 is known as the one to be mounted in a vehicle. This electrical connection box is formed such that a circuit board is accommodated in a casing made of synthetic resin. The casing includes an upper case with an open lower side and a lower case for closing an opening of this upper case. The circuit board is accommodated in an accommodation space formed by assembling the upper case and the lower case.

An opening facing forward is formed in a wall portion of the upper case, and a connector is arranged in this opening. The connector is provided with a connector housing made of synthetic resin and including a receptacle in which a mating connector is fittable. Substantially L-shaped terminal fittings are arranged in the connector housing. One end part of the terminal fitting is arranged in the receptacle. The other end part of the terminal fitting penetrates through the back wall of the receptacle and is connected to a conductive path formed on the circuit board by a known technique such as soldering.

In the conventional technology, the connector is integrally formed to the upper case. Upper sides, opposite lateral sides and back sides of parts of the terminal fittings located opposite to the receptacle are covered by the wall portion of the upper case. This suppresses the adhesion of water, dust and the like to the terminal fittings. As a result, a short circuit between the terminal fittings can be suppressed.

On the other hand, since the circuit board and the connector housing are made of materials having different coefficients of thermal expansion, a stress may be generated between the circuit board and the connector housing due to a temperature change. If this stress acts on a connecting part of the terminal fitting and the conductive path of the circuit board, electrical connection reliability between the terminal fitting and the conductive path of the circuit board may be reduced, for example, due to a crack formed in the soldered part and the like.

In the electrical connection box according to the conventional technology, parts of the terminal fittings extending backward from the back wall of the receptacle are embedded in the upper case. On the other hand, parts of the terminal fittings extending downward are exposed from the wall portion of the upper case. By the resilient deformation of the parts of the terminal fittings exposed from the wall portion of the upper case, it has been expected to relax a stress acting between the circuit board and the connector housing.

However, a stress acting between the circuit board and the connector housing may not be sufficiently relaxed only by the resilient deformation of the parts of the terminal fittings exposed from the upper case and extending downward.

The present invention was completed based on the above situation and aims to provide a connector and an electrical connection box with improved electrical connection reliability between a terminal fitting and a circuit board and provide a connector manufacturing method.

SUMMARY OF THE INVENTION

The present invention is directed to a connector manufacturing method for a connector in which a terminal fitting is arranged in a connector housing including a receptacle with an open front side, including a first molding step of placing a bar-shaped terminal fitting in a first mold and pouring a first synthetic resin material into a cavity of the first mold, thereby forming a primary molded portion including a base wall through which the terminal fitting penetrates and a lid wall extending backward from a position of the base wall near the upper end and configured to cover the terminal fitting from above with a clearance formed therebetween; a bending process of bending the terminal fitting projecting from the base wall toward the lid wall substantially at a right angle at a position before an end of the lid wall, thereby forming a first projecting portion projecting in an extending direction of the lid plate from the base wall and a second projecting portion bent downward substantially at a right angle at an end of the first projecting portion and to be connected to a conductive path formed on a circuit board; and a second process of placing the primary molded portion in a second mold, bringing the upper end edge of a lower restricting wall provided to vertically extend in the second mold into contact with the lower surface of the lid wall from below, and pouring a second synthetic resin material into a cavity of the second mold with the first projecting portion and the second projecting portion arranged in a space closed by the lower restricting wall and the lid wall to form a secondary molded portion fixed to the primary molded portion, wherein the receptacle and a protection wall extending backward from a back wall of the receptacle, integrally formed to the connector housing and configured to cover the first and second projecting portions from an upper side, opposite lateral sides and a rear side with clearances formed between the protection wall and both the first and second projecting portions are formed by the primary molded portion and the secondary molded portion.

Further, the present invention is directed to a connector in which a substantially L-shaped terminal fitting is mounted in a connector housing including a receptacle with an open front side, wherein one end part of the terminal fitting is arranged in the receptacle and the other end part thereof is connected to a conductive path formed on a circuit board; the terminal fitting includes a first projecting portion projecting backward from a back wall of the receptacle and a second projecting portion bent downward substantially at a right angle from an end of the first projecting portion and to be connected to the circuit board; and the connector housing is integrally formed with a protection wall extending backward from the back wall of the receptacle and configured to cover the first and second projecting portions from an upper side, opposite lateral sides and a rear side with clearances formed between the protection wall and both the first and second projecting portions.

Further, the present invention is directed to an electrical connection box, including an upper case with an open lower side, a lower case for closing an opening of the upper case and a circuit board to be accommodated in an accommodation space formed by the upper case and the lower case in a state where the upper case and the lower case are assembled, wherein the upper case is integrally formed with a connector in which a substantially L-shaped terminal fitting is mounted in a connector housing including a receptacle with an open front side; one end part of the terminal fitting is arranged in the receptacle and the other end part thereof is connected to a conductive path formed on a circuit board; the terminal fitting includes a first projecting portion projecting backward from a back wall of the receptacle and a second projecting portion bent downward substantially at a right angle from an end of the first projecting portion and to be connected to the circuit board; and the connector housing is integrally formed with a protection wall extending backward from the back wall of the receptacle and configured to cover the first and second projecting portions from an upper side, opposite lateral sides and a rear side with clearances formed between the protection wall and both the first and second projecting portions.

According to the present invention, a stress generated between the circuit board and the connector housing due to a difference between a coefficient of thermal expansion of the circuit board and that of the connector housing is relaxed by the resilient deformation of the first and second projecting portions. Since the action of a stress on a connecting part of the terminal fitting and the circuit board can be suppressed in this way, connection reliability between the terminal fitting and the circuit board can be improved.

DETAILED DESCRIPTION OF THE PREFERRED EMBODIMENTS

Figure 2:
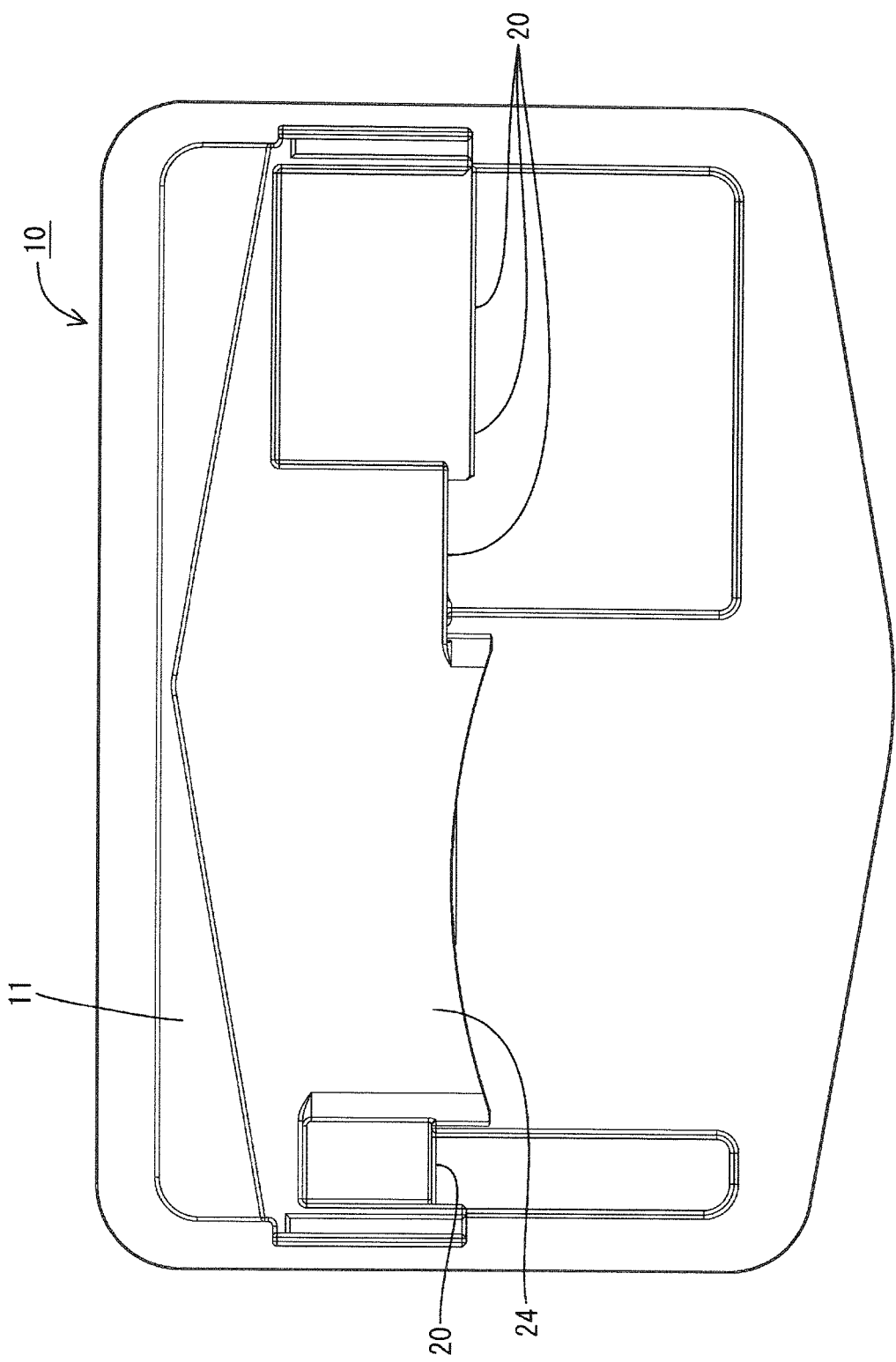
FIG. 2 is a plan view showing the electrical connection box.
Figure 3:
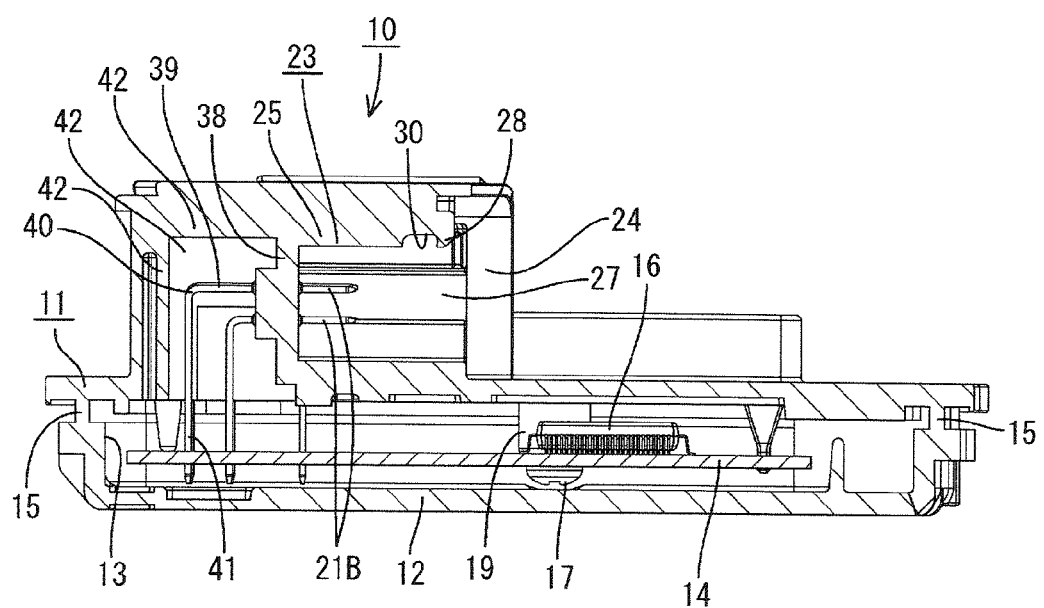
FIG. 3 is a section along III-III of FIG. 4.

One embodiment of the present invention is described with reference to FIGS. 1 to 10. An electrical connection box 10 according to this embodiment includes an upper case 11 with an open lower side made of synthetic resin and a lower case 12 made of synthetic resin and configured to close an opening of this upper case 11. A circuit board 14 is accommodated in an accommodation space 13 formed by the upper and lower cases 11, 12 in a state where the upper and lower cases 11, 12 are assembled. In the following description, upper and lower sides in FIG. 3 are respectively referred to as upper and lower sides. Further, right and left sides in FIG. 3 are respectively referred to as front and rear sides. Further, left and right sides in FIG. 2 are respectively referred to as left and right sides.

The lower case 12 is in the form of a shallow dish with an open upper side and has a substantially pentagonal shape when viewed from above. A welding rib 15 projecting upward and in the form of a closed loop is formed on an opening edge part of the lower case 12.

The upper case 11 has a substantially pentagonal shape when viewed from above. The lower case 12 is assembled below the upper case 11 to close the downward facing opening of the upper case 11. When the upper case 11 and the lower case 12 are assembled, the welding rib 15 of the lower case 12 comes into contact with the opening edge part of the upper case 11 from below. The welding rib 15 of the lower case 12 is vibration welded to the upper case 11 by applying vibration to the lower case 12 and the upper case 11 in this state. Since the welding rib 15 is in the form of a closed loop as described above, the lower case 12 and the upper case 11 are tightly welded in an uninterrupted manner over the entire circumference. In this way, the lower case 12 and the upper case 11 are fixed in a liquid-tight manner.

As shown in FIG. 3, the accommodation space 13 for accommodating the circuit board 14 is formed between the lower surface of the upper case 11 and the upper surface of the lower case 12 in a state where the upper case 11 and the lower case 12 are assembled. The circuit board 14 is accommodated in this accommodation space 13. The circuit board 14 has a substantially rectangular shape when viewed from above. Unillustrated conductive paths are formed on one or both of the top and underside surfaces of the circuit board 14 by a printed wiring technology. An electronic component 16 is connected to these conductive paths by a known technology such as soldering.

Figure 1:
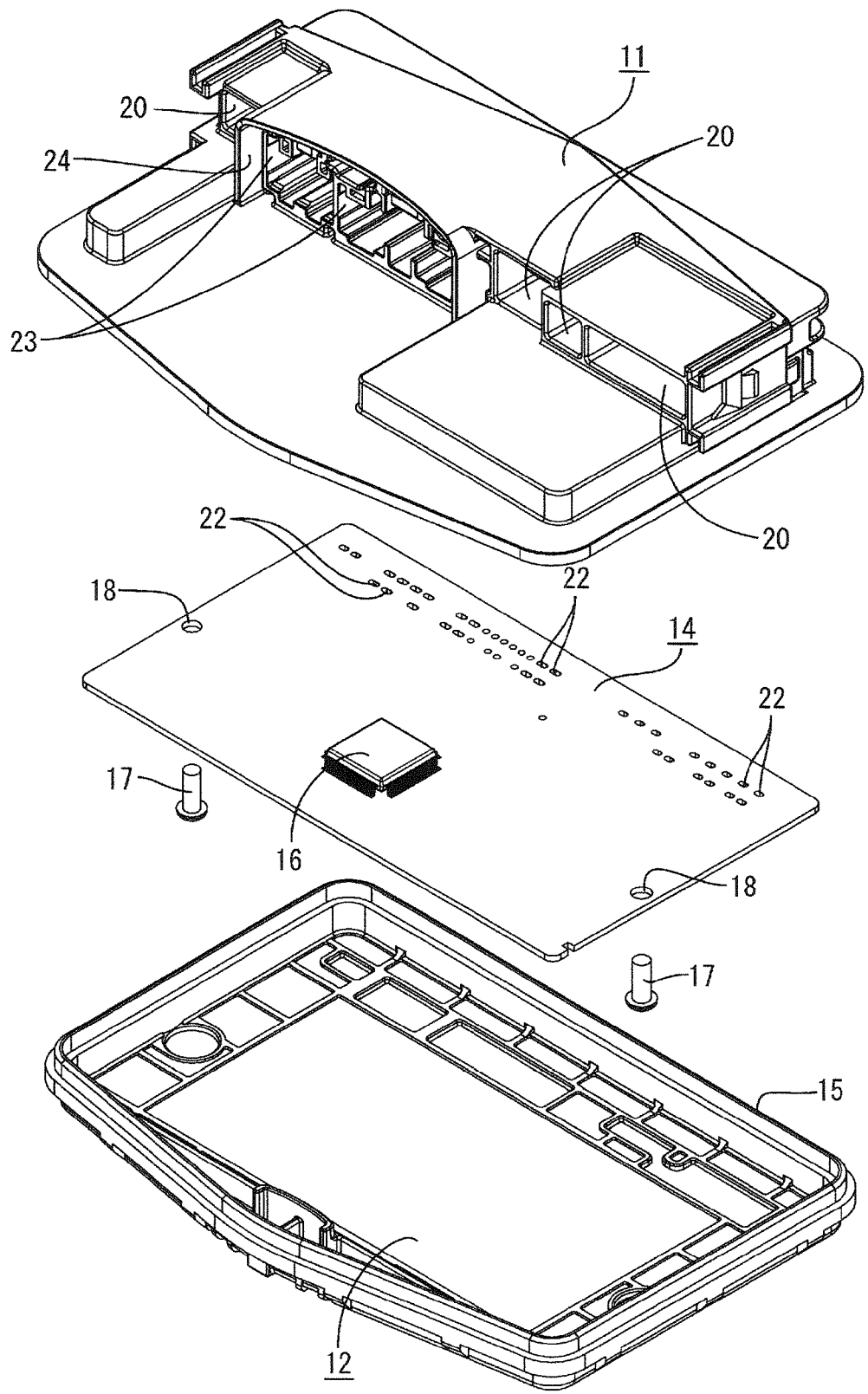
FIG. 1 is an exploded perspective view showing an electrical connection box according to one embodiment of the present invention.

The circuit board 14 is formed with bolt insertion holes 18 through which bolts 17 are to be inserted (see FIG. 1). Further, as shown in FIG. 3, bosses 19 each including a screw hole (not shown) are formed to project from the lower surface of the upper case 11. The circuit board 14 is fixed to the upper case 11 by inserting the bolts 17 into the bolt insertion holes 18 and threadably engaging them with the screw holes of the bosses 19 from the underside (lower side in FIG. 3).

Figure 4:
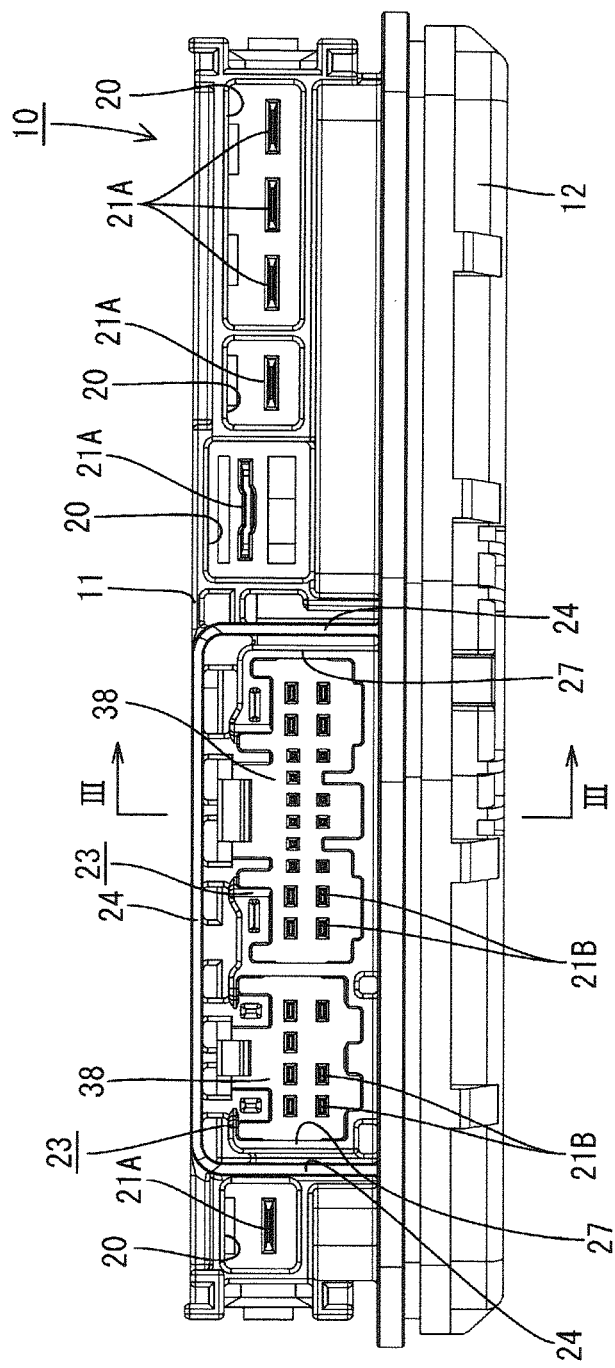
FIG. 4 is a front view showing the electrical connection box.

As shown in FIG. 2, a plurality of (three in this embodiment) connector receptacles 20 with an open front side (lower side in FIG. 2) are formed in a substantially right half area of a substantially rear part (upper part in FIG. 2) of the upper case 11. The connector receptacles 20 are substantially in the form of rectangular tubes. As shown in FIG. 4, tab-shaped terminal fittings 21A are arranged in these connector receptacles 20. These terminal fittings 21A are bent substantially at a right angle toward the circuit board 14 after penetrating through the connector receptacles 20 and projecting into the accommodation space 13. End parts of the terminal fittings bent toward the circuit board 14 are inserted through through holes 22 formed in the circuit board 14 and connected to the conductive paths by a known technology such as soldering.

Further, as shown in FIG. 2, one connector receptacle 20 with an open front side is also formed at a position near the left end in a substantially rear part. Similarly to the above, a tab-shaped terminal fitting 21A arranged in this connector receptacle 20 is also connected to the circuit board 14.

As shown in FIG. 2, a surrounding wall 24 with an open front side configured to accommodate connectors 23 inside is formed in a substantially left half area of a substantially rear part of the upper cover 11. The surrounding wall 24 is substantially gate-shaped. In this embodiment, two connectors 23 are arranged in a lateral direction (lateral direction in FIG. 4) inside the surrounding wall 24. The connectors 23 are integrally formed to the upper cover 11. Clearances are formed between the surrounding wall 24 and the connectors 23.

Figure 5:
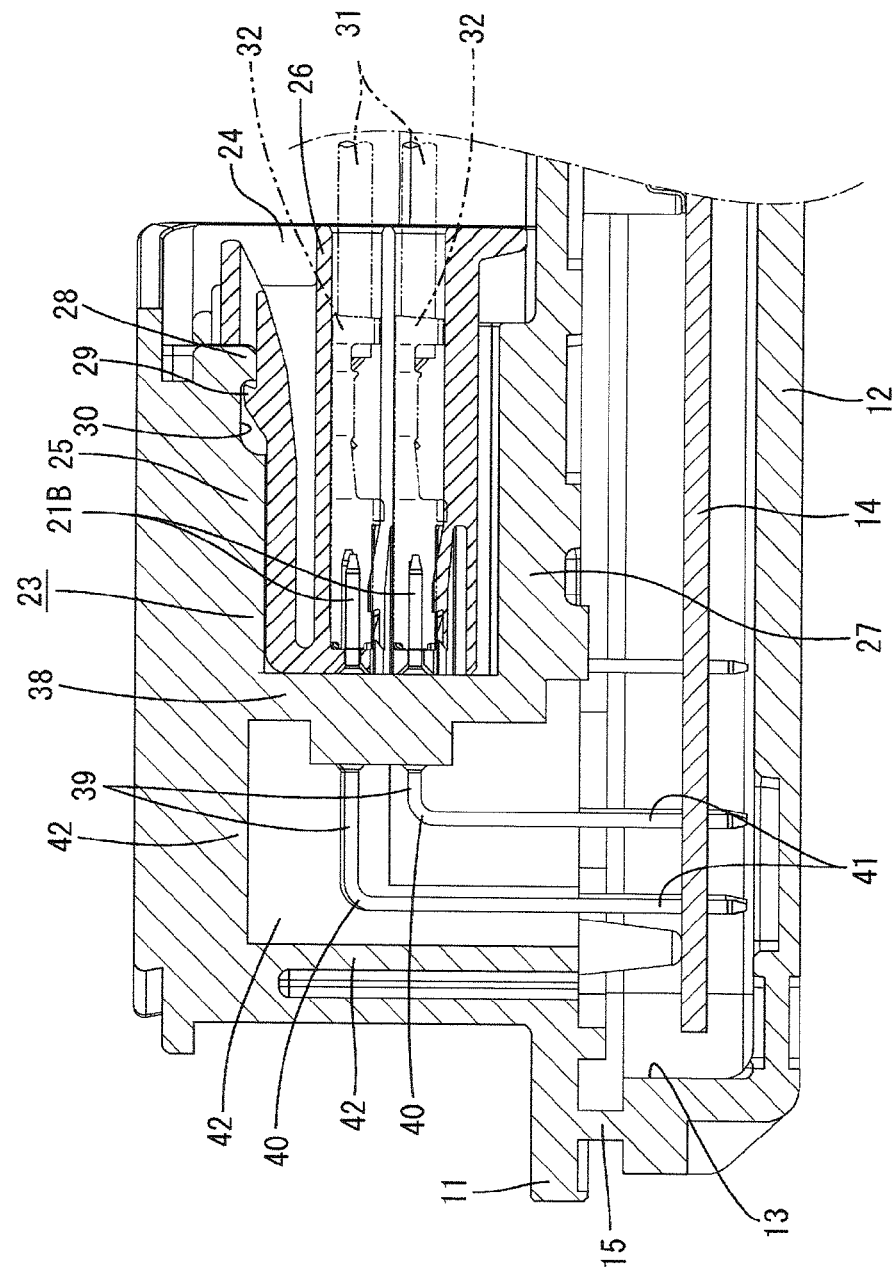
FIG. 5 is an enlarged section showing an essential part of the electrical connection box.

As shown in FIG. 5, the connector 23 includes a connector housing 25 made of synthetic resin. The connector housing 25 includes a receptacle 27 with an open front side (right side in FIG. 5) into which a mating connector 26 is to be fitted. A locking portion 28 for locking the mating connector 26 is formed at a position near the front end on the inner wall of the receptacle 27. As shown in FIG. 5, the locking portion 28 is engaged with a locking projection 29 formed to project from the mating connector 26 from front (right side in FIG.

5), thereby preventing the mating connector 26 from coming out forward from the receptacle 27.

The locking projection 29 of the mating connector 26 is accommodated in a recess 30 formed on the inner wall of the receptacle 27 in a state where the mating connector 26 is properly fitted in the receptacle 27. The above locking portion 28 is formed at a position of the receptacle 27 before the recess 30.

Female terminal fittings 32 connected to ends of wires 31 are accommodated in the mating connector 2626. These female terminal fittings 32 and the terminal fittings 21B arranged in the receptacle 27 are connected, thereby electrically connecting the terminal fittings 21B and the wires 31.

The connector housing 25 includes a primary molded portion 33 made of a first synthetic resin material and a secondary molded portion 34 formed on this primary molded portion 33 using a second synthetic resin material. In this embodiment, the same synthetic resin is used as the first and second synthetic resin materials. Thus, the primary molded portion 33 and the secondary molded portion 34 are integrally fixed, and a boundary part between the primary molded portion 33 and the secondary molded portion 34 cannot be clearly distinguished. Further, different synthetic resins may be used as the first and second synthetic resin materials.

Figure 6:
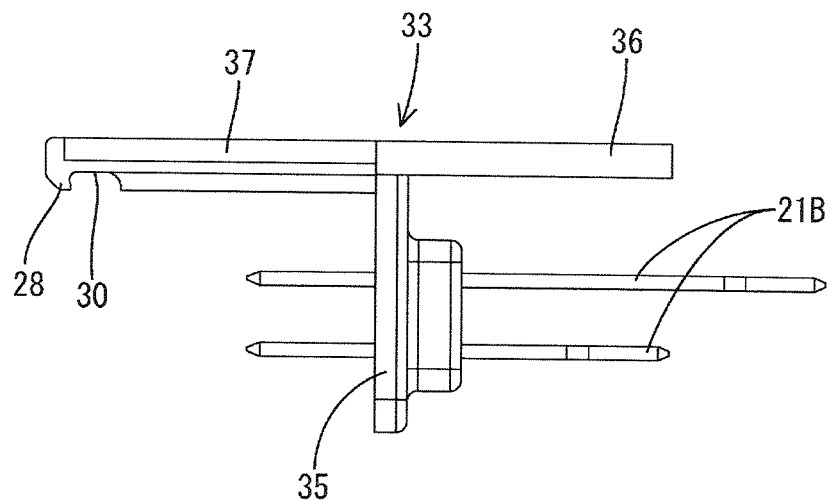
FIG. 6 is a side view showing a primary molded portion.
Figure 7:
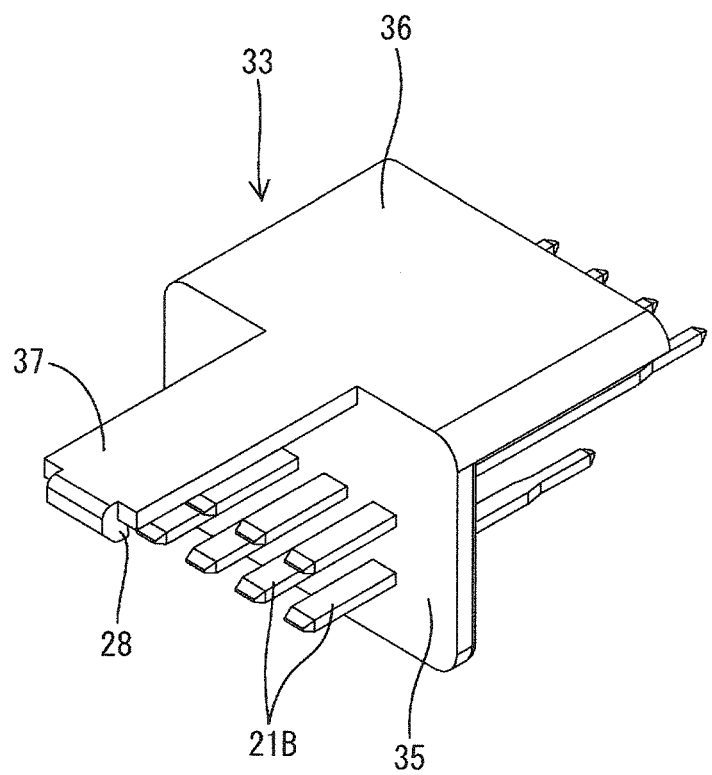
FIG. 7 is a perspective view showing the primary molded portion.

As shown in FIGS. 6 and 7, the primary molded portion 33 includes a base wall 35 through which a plurality of terminal fittings 21B penetrate, a lid wall 36 extending backward (rightward in FIG. 6) from a position of this base wall 25 near the upper end and configured to cover the terminal fittings 21B from above, and an extending piece 37 extending forward (leftward in FIG. 6) from a position of the base wall 35 near the upper end. The recess 30 and the locking portion 28 described above are formed at positions of the extending piece 37 near the front end. The base wall 35 constitutes a back wall 38 of the receptacle 27 after the secondary molded portion 34 is formed.

As shown in FIG. 5, each terminal fitting 21B is substantially L-shaped. One end part of the terminal fitting 21B is arranged in the receptacle 27 to be connected to the female terminal fitting 32 of the mating connector 26. Further, the other end part of the terminal fitting 21B projects backward from the receptacle 27.

A part of the terminal fitting 21B projecting backward from the receptacle 27 is composed of a first projecting portion 39 extending backward, a bent portion 40 bent downward substantially at a right angle at an end of this first projecting portion 39 and a second projecting portion 41 extending downward from this bent portion 40. The circuit board 14 is formed with the through holes 22, and a lower end part of the second projecting portion 41 is inserted into the through hole 22 and connected to the conductive path of the circuit board 14 by a known technique such as soldering.

As shown in FIG. 5, the connector housing 25 is integrally formed with a protection wall 42 extending backward (leftward in FIG. 5) from the back wall 38 and configured to cover the first projecting portions 39, the bent portions 40 and the second projecting portions 41 from an upper side (upper side in FIG. 5), opposite lateral sides (in a direction penetrating through the plane of FIG. 6) and a rear side (left side in FIG. 5). Clearances are formed between the protection wall 42 and the first projecting portions 39, the bent portions 40 and the second projecting portions 41. In this way, the first projecting portions 39, the bent portion 40 and the second projecting portions 41 are exposed from both the first synthetic resin material and the second synthetic resin material. In other words, a rear part of the connector housing 25 is covered by the protection wall 42 except at the lower side (side facing the circuit board 14).

The above protection wall 42 is composed of the primary molded portion 33 constituting the lid wall 36 and the secondary molded portion 34 fixed to the lid wall 36. As shown in FIG. 5, this protection wall 42 constitutes a part of a wall portion forming the upper cover 11.

Next, an example of a manufacturing process of the electrical connection box 10 according to this embodiment is described. First, a process of manufacturing the upper cover 11 is described.

First, a pair of first molds 43A, 43B are opened. Bar-shaped terminal fittings 21 are placed at predetermined positions of the first mold 43A out of the pair of first molds 43A, 43B. Subsequently, the other first mold 43B is clamped, and the first synthetic resin material in a liquid state is poured into a cavity formed inside the first molds 43A, 43B.

Figure 8:
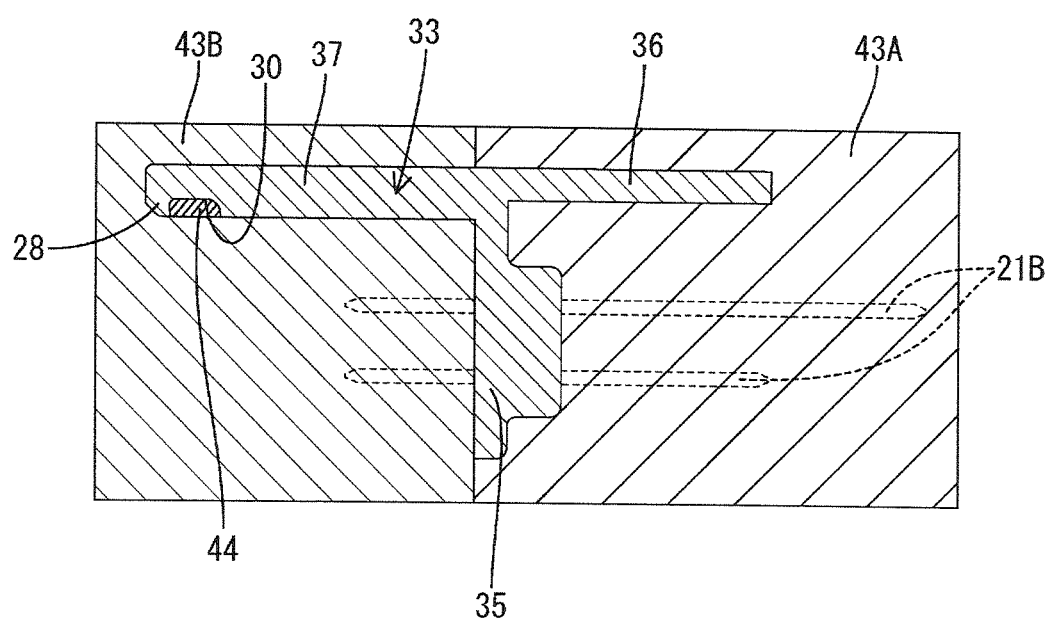
FIG. 8 is a section showing a first molding process.

The above first molds 43A, 43B are opened in forward and backward directions (lateral direction in FIG. 8). With the first molds 43A, 43B clamped, a slide core 44 which slides in a direction parallel to the plate surface of the extending piece 37 and perpendicular to an extending direction of the extending piece 37 is arranged in an area of the cavity where the recess 30 is to be formed. The first synthetic resin material is poured into a cavity formed between this slide core 44 and the first molds 43A, 43b, thereby forming the extending piece 37 and the locking portion 28.

After the first synthetic resin material poured into the cavity is cured to form the extending piece 37, the slide core 44 is slid to be separated from the primary molded portion 33. Subsequently, the first molds 43A, 43B are opened to separate the primary molded portion 33 from the first molds 43A, 43B.

Subsequently, parts of the terminal fittings 21 projecting backward from the base wall 35 of the primary molded portion 33 are bent downward substantially at a right angle at a position before the rear end of the lid wall 36 using a known jig. In this way, the first projecting portions 39, the bent portions 40 and the second projecting portions 41 are formed.

Subsequently, a second mold 45A, 45B, 45C is opened and the primary molded portion 33 after the bending process is applied is placed at a predetermined position. Thereafter, the second mold 45A, 45B, 45C is clamped. With the second mold 45A, 45B, 45C clamped, the second synthetic resin material 34 is subsequently poured into a cavity formed between the primary molded portion 33 and the second mold 45A, 45B, 45C, thereby forming the secondary molded portion 34.

Figure 9:
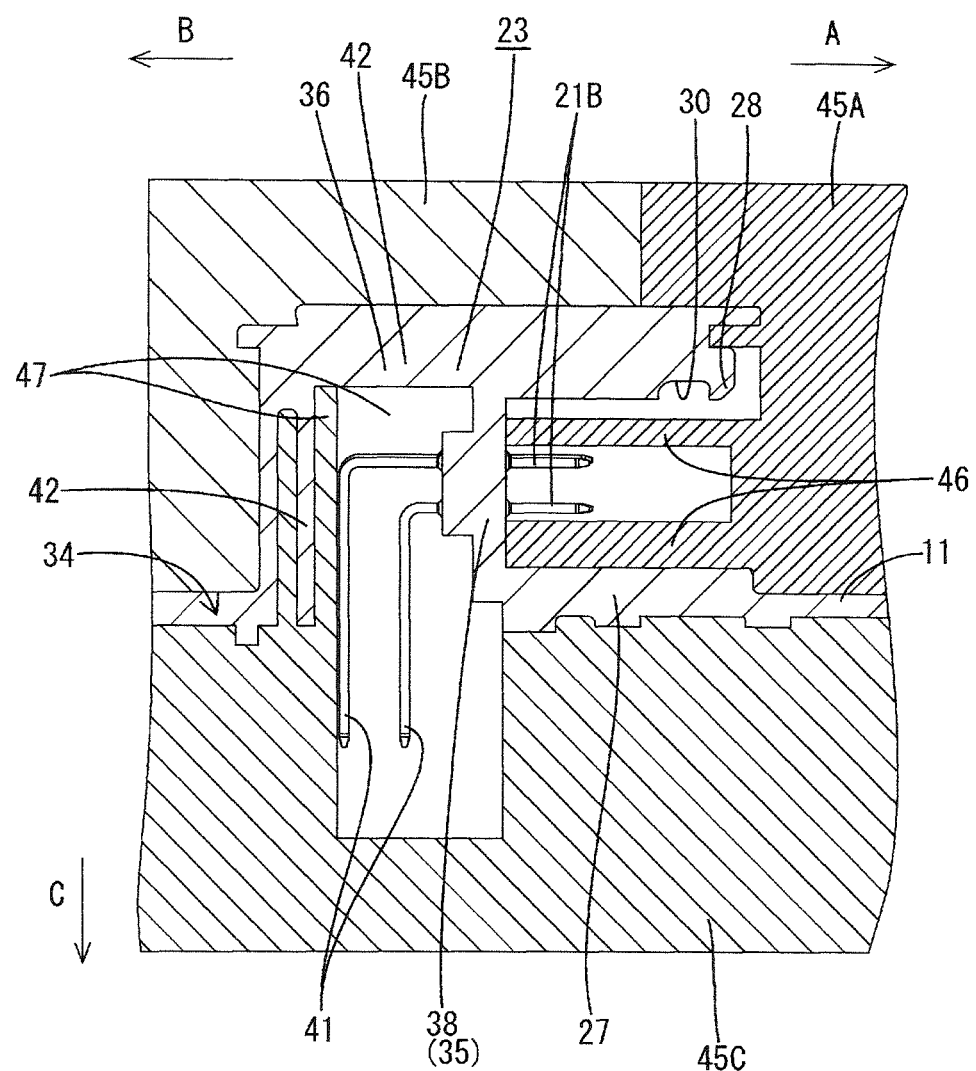
FIG. 9 is an enlarged section showing an essential part of a second molding process.

As shown in FIG. 9, the second mold 45A, 45B, 45C includes a front second mold 45A which is opened in a forward direction (direction indicated by an arrow A), a rear second mold 45B which is opened in a backward direction (direction indicated by an arrow B) and a lower second mold 45C which is opened in a downward direction (direction indicated by an arrow C).

In the second process, the second mold 45A, 45B, 45C is partly in contact with the primary molded portion 33 while being clamped. This prevents the second synthetic resin material from being poured into a closed space enclosed by the second mold 45A, 45B, 45C and the primary molded portion 33. This is described in detail below.

The front second mold 45A is formed with a front restricting wall 46 projecting backward. A rear end part of this front restricting wall 46 comes into contact with the front surface of the base wall 35 from front with the second mold 45A, 45B, 45C clamped. Areas of the terminal fittings 21B to be arranged in the receptacle 27 are accommodated in a closed space enclosed by the front restricting wall 46 and the base wall 35. In this way, the receptacle 27 is formed of the second synthetic resin material and the adhesion of the second synthetic resin material to the areas of the terminal fittings 21B arranged in the receptacle 27 is prevented.

Further, the lower second mold 45C is formed with lower restricting walls 47 projecting upward. Upper end parts of these lower restricting walls 47 come into contact with the lower surface of the lid wall 36 from below with the second mold 45C, 45B, 45C clamped. A rear end part of the lid wall 36 projects more backward than the first projecting portions 39 of the terminal fittings 21B and the upper end parts of the lower restricting walls 47 come into contact with the rear end part of this lid wall 36 from below. Further, the lower restricting walls 47 are formed to be located at the opposite left and right sides of the first projecting portions 39, the bent portions 40 and the second projecting portions 41 of the terminal fittings 21B. This causes the lower restricting walls 47 to come into contact with parts of the lower surface of the lid wall 36 near the opposite left and right edges from below with the second mold 45C, 45B, 45C clamped. In this way, the first projecting portions 39, the bent portions 40 and the second projecting portions 41 of the terminal fittings 21B are accommodated in a space enclosed and closed by the lower restricting walls 47 and the lid wall 36. As a result, the protection wall 42 is formed of the second synthetic resin material and the adhesion of the second synthetic resin material to the first projecting portions 39, the bent portions 40 and the second projecting portions 41 of the terminal fittings 21B is prevented.

Further, the second synthetic resin material is poured into a cavity enclosed by the front second mold 45A, the rear second mold 45B and the lower second mold 45C, thereby forming the wall portion of the upper case 11.

Figure 10:
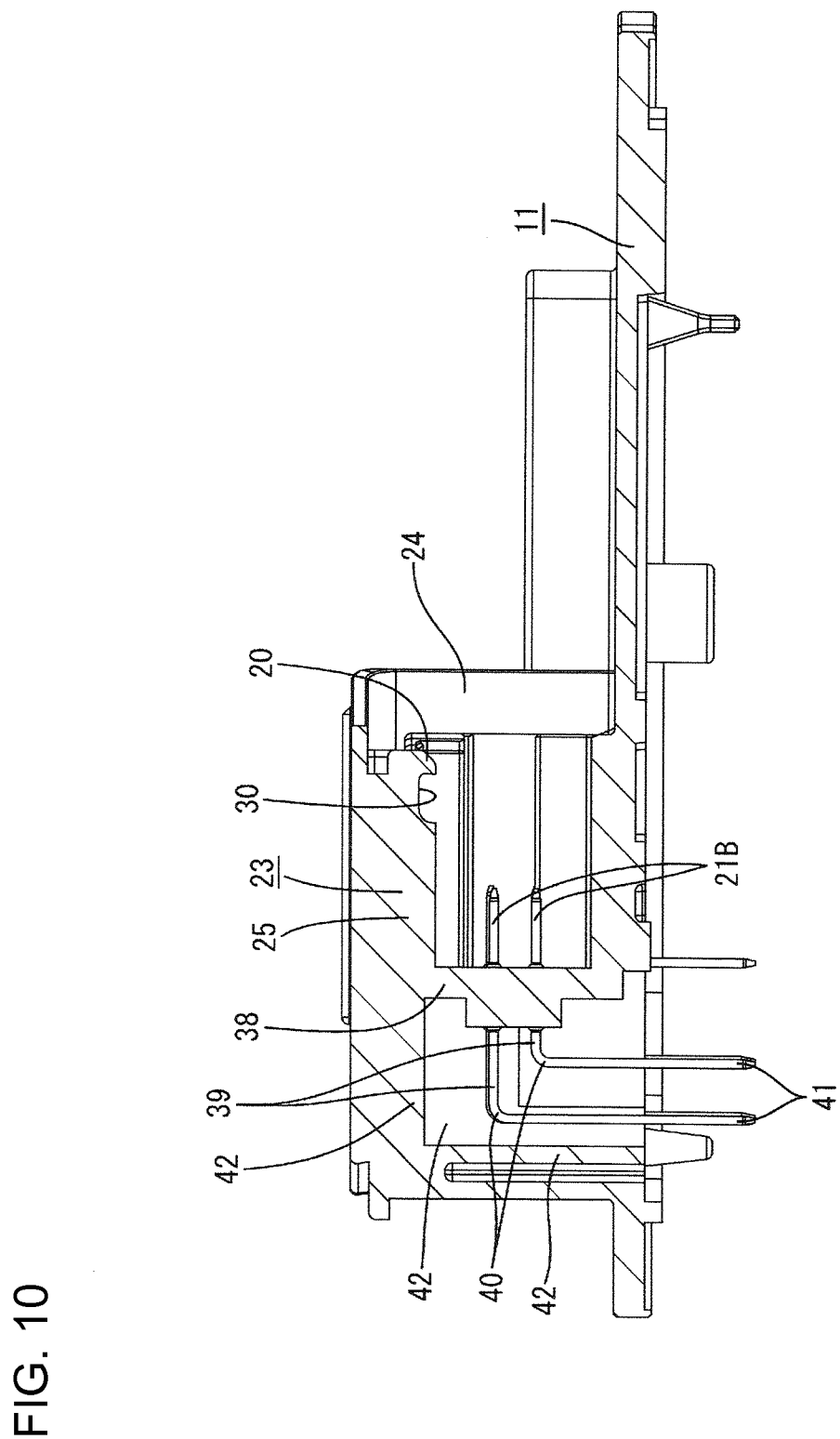
FIG. 10 is a section showing an upper case.

After the second synthetic resin material is cured, the second mold 45A, 45B, 45C is opened and the upper case 11 is separated from the second mold 45A, 45B, 45C. In this way, the upper case 11 is formed as shown in FIG. 10.

Subsequently, the circuit board 14 mounted with the electronic component 16 is secured to the lower surface of the upper case 11 by the bolts 17. At this time, the terminal fittings 21A, 21B are inserted into the through holes 22 of the circuit board 14. Subsequently, the terminal fittings 21A, 21B and the through holes 22 are connected, for example, by a known technique such as flow soldering.

Thereafter, vibration is applied to the lower case 12 and the upper case 11 with the welding rib 15 of the lower case 12 and the opening edge of the upper case 11 held in contact, whereby the lower case 12 and the upper case 11 are vibration welded. In this way, the electrical connection box 10 is completed. The electrical connection box 10 is used by being mounted in an unillustrated vehicle. The electrical connection box 10 can be mounted in the vehicle in an arbitrary posture according to need.

Next, functions and effects of this embodiment are described. According to this embodiment, the first projecting portions 39, the bent portions 40 and the second projecting portions 41 of the terminal fittings 21 projecting backward from the connector housing 25 are covered from the upper side, the opposite left and right sides and the rear side by the protection wall 42. Since this protection wall 42 constitutes a part of the wall portion of the upper case 11, the adhesion of water, dust and the like to the terminal fittings 21B can be suppressed. Further, the collision of external matters with the terminal fittings 21B can also be suppressed.

Further, the above protection wall 42 covers the first projecting portions 39, the bent portions 40 and the second projecting portions 41 with the clearances formed therebetween and the first projecting portions 39, the bent portions 40 and the second projecting portions 41 are exposed from the first and second synthetic resin materials. This enables a stress acting between the circuit board 14 and the terminal fittings 21B arranged in the connector housing 25 due to a difference between a coefficient of thermal expansion of the material forming the circuit board 14 and that of the material forming the connector housing 25 to be absorbed by the resilient deformation of the first projecting portions 39, the bent portions 40 and the second projecting portions 41. As a result, the action of a stress on connecting parts of the terminal fittings 21B (second projecting portions 41) and the circuit board 14 can be suppressed, wherefore connection reliability between the terminal fittings 21B and the circuit board 14 can be improved.

Further, in this embodiment, the extending piece 37 extending forward from the position of the base wall 35 near the upper end and the locking portion 28 projecting toward the terminal fittings 21B at the leading end of the extending piece 37 and configured to lock the mating connector 26 are formed in the first process. Since this makes it unnecessary to provide the receptacle 27 with a mold removal hole for forming the locking portion 28, the waterproof property of the connector 23 can be improved.

Further, since the same synthetic resin is used as the first and second synthetic resin materials in this embodiment, manufacturing cost can be reduced as compared with the case where the first and second synthetic resin materials are different synthetic resins.

The present invention is not limited to the above described and illustrated embodiment. For example, the following embodiments are also included in the technical scope of the present invention.

Although the connector 23 is integrally formed to the upper case 11 and the protection wall 42 forms a part of the wall portion of the upper case 11 in this embodiment, there is no limitation to this and the connector 23 according to the present invention may be applied to a board connector 23. For example, the connector 23 may be formed separately from the upper case 11 and the lower case 12, may be accommodated in the accommodation space 13 formed by assembling the upper case 11 and the lower case 12 and may be fixed to the circuit board 14 by a known means such as the tightening of the bolts 17 in a state where the receptacle 27 is exposed from an opening formed in the upper case 11 or the lower case 12. In this way, the adhesion of water having entered the accommodation space 13, water condensed in the accommodation space 13 and the like to the terminal fittings 21 can be suppressed.

Although the base wall 35 is formed with the extending piece 37 and the locking portion 28 in this embodiment, there is no limitation to this and the extending piece 37 and the locking portion 28 may be omitted.

Although the second projecting portions 41 of the terminal fittings 21B are inserted into the through holes 22 formed in the circuit board 14 and soldered in this embodiment, there is no limitation to this and, for example, the leading ends of the second projecting portions 41 may be formed to have a press-fit structure to be resiliently held in contact with the inner wall surfaces of the through holes 22. Further, the leading ends of the second projecting portions 41 may be further bent at a right angle to form a crank shape and connected to the conductive paths formed on the surface of the circuit board 14 by reflow soldering.

Although a plurality of terminal fittings 21B are arranged in the connector 23 in this embodiment, one terminal fitting 21B may be arranged in one connector 23.

The technology disclosed in this description is directed to a connector manufacturing method for a connector in which a terminal fitting is arranged in a connector housing including a receptacle with an open front side, including a first molding step of placing a bar-shaped terminal fitting in a first mold and pouring a first synthetic resin material into a cavity of the first mold, thereby forming a primary molded portion including a base wall through which the terminal fitting penetrates and a lid wall extending backward from a position of the base wall near the upper end and configured to cover the terminal fitting from above with a clearance formed therebetween; a bending process of bending the terminal fitting projecting from the base wall toward the lid wall substantially at a right angle at a position before an end of the lid wall, thereby forming a first projecting portion projecting in an extending direction of the lid plate from the base wall and a second projecting portion bent downward substantially at a right angle at an end of the first projecting portion and to be connected to a conductive path formed on a circuit board; and a second process of placing the primary molded portion in a second mold, bringing the upper end edge of a lower restricting wall provided to vertically extend in the second mold into contact with the lower surface of the lid wall from below, and pouring a second synthetic resin material into a cavity of the second mold with the first projecting portion and the second projecting portion arranged in a space closed by the lower restricting wall and the lid wall to form a secondary molded portion fixed to the primary molded portion, wherein the receptacle and a protection wall extending backward from a back wall of the receptacle, integrally formed to the connector housing and configured to cover the first and second projecting portions from an upper side, opposite lateral sides and a rear side with clearances formed between the protection wall and both the first and second projecting portions are formed by the primary molded portion and the secondary molded portion.

Further, the technology disclosed in this description is directed to a connector in which a substantially L-shaped terminal fitting is mounted in a connector housing including a receptacle with an open front side, wherein one end part of the terminal fitting is arranged in the receptacle and the other end part thereof is connected to a conductive path formed on a circuit board; the terminal fitting includes a first projecting portion projecting backward from a back wall of the receptacle and a second projecting portion bent downward substantially at a right angle from an end of the first projecting portion and to be connected to the circuit board; and the connector housing is integrally formed with a protection wall extending backward from the back wall of the receptacle and configured to cover the first and second projecting portions from an upper side, opposite lateral sides and a rear side with clearances formed between the protection wall and both the first and second projecting portions.

Further, the technology disclosed in this description is directed to an electrical connection box, including an upper case with an open lower side, a lower case for closing an opening of the upper case and a circuit board to be accommodated in an accommodation space formed by the upper case and the lower case in a state where the upper case and the lower case are assembled, wherein the upper case is integrally formed with a connector in which a substantially L-shaped terminal fitting is mounted in a connector housing including a receptacle with an open front side; one end part of the terminal fitting is arranged in the receptacle and the other end part thereof is connected to a conductive path formed on a circuit board; the terminal fitting includes a first projecting portion projecting backward from a back wall of the receptacle and a second projecting portion bent downward substantially at a right angle from an end of the first projecting portion and to be connected to the circuit board; and the connector housing is integrally formed with a protection wall extending backward from the back wall of the receptacle and configured to cover the first and second projecting portions from an upper side, opposite lateral sides and a rear side with clearances formed between the protection wall and both the first and second projecting portions.

According to the technology disclosed in this description, a stress generated between the circuit board and the connector housing due to a difference between a coefficient of thermal expansion of the circuit board and that of the connector housing is relaxed by the resilient deformation of the first and second projecting portions. Since the action of a stress on a connecting part of the terminal fitting and the circuit board can be suppressed in this way, connection reliability between the terminal fitting and the circuit board can be improved.

The technology disclosed in this description is preferably embodied as follows. An extending piece extending forward from a position of the base wall near the upper end and a locking portion projecting toward the terminal fitting from the leading end of the extending piece and configured to lock the mating connector may be formed in the first process, and the receptacle may be formed by the secondary molded portion fixed to the extending piece in the second process.

According to the above mode, the waterproof property of the connector can be improved since it is not necessary to provide the receptacle with a mold removal hole for forming the locking portion.

The same synthetic resin may be used as the first and second synthetic resin materials.

According to the above mode, manufacturing cost can be reduced.

Further, the protection wall may form a part of a wall portion of the upper case. According to this mode, the adhesion of water and dust to the terminal fitting can be suppressed by the protection wall.

According to the technology disclosed in this description, electrical connection reliability between the terminal fitting and the circuit board can be improved.

The invention claimed is:
1. A connector manufacturing method for a connector in which a terminal fitting is arranged in a connector housing including a lower board mounting surface and receptacle with an open front side, comprising:
providing a bar-shaped terminal fitting having opposite front and rear ends;
placing the front end of the terminal fitting in a first front mold that has a front mold cavity of a first width and placing the rear end of the terminal fitting in a first rear mold that has a rear mold cavity of a second width that is wider than the first width, the first front mold having a slide core in the front mold cavity that moves transverse to a relative moving direction between the first front mold and the first rear mold;
pouring a first synthetic resin material into a first cavity between the first front and rear molds;
curing the synthetic resin;
opening the first and second front molds and the slide core, thereby forming a primary molded portion includ- ing a base wall surrounding a portion of the terminal fitting, a lid wall extending backward normally from a position of the base wall near an upper end and to a position forward of the rear end of the terminal fitting and above with a clearance formed therebetween and an extending piece extending forward normally from a position of the base wall near the upper end and to a position forward of the front end of the terminal fitting and having a lower surface above the terminal fitting with a clearance therebetween, the extending piece being narrower than the base wall and the lid wall and having a locking recess formed on the lower surface by the slide core;

bending the terminal fitting substantially at a right angle at a position between the base wall and an end of the lid wall, thereby forming a first projecting portion projecting in an extending direction of the lid wall from the base wall and a second projecting portion bent downward substantially at a right angle at an end of the first projecting portion and to be connected to a conductive path formed on a circuit board;

placing the primary molded portion in a second mold and bringing an upper end edge of a lower restricting wall projecting vertically from the second mold into contact with a lower surface of the lid wall from below to define a space enclosing the first projecting portion and the second projecting portion and a second cavity rearward of the space; and pouring a second synthetic resin material into the second cavity of the second mold to form a secondary molded portion fixed to the primary molded portion, the secondary molded portion extending down from the lid wall sufficiently to define part of the board mounting surface and to define the receptacle with an upper wall extending to opposite sides of the extending piece and opposite sides of the locking recess, wherein the base wall, the lid wall, and the secondary molded portion define a protection wall configured to cover the first and second projecting portions from an upper side, opposite lateral sides and a rear side with clearances formed between the protection wall and both the first and second projecting portions.

2. The connector manufacturing method of claim 1, wherein the same synthetic resin is used as the first and second synthetic resin materials.

3. A connector in which a substantially L-shaped terminal fitting is mounted in a connector housing including a receptacle with an open front side, wherein:
a front end part of the terminal fitting is arranged in the receptacle, a rear end part thereof is connected to a conductive path formed on a circuit board, and an intermediate part is molded integrally into a base wall of the receptacle;
the terminal fitting further includes a first projecting portion projecting backward from a base wall of the receptacle and a second projecting portion bent downward substantially at a right angle from an end of the first projecting portion and extending to the rear end part that is connected to the circuit board; and
the connector housing is integrally formed with a lid wall extending backward from the base wall of the receptacle, a rear wall spaced from the base wall and projecting from the lid wall to the circuit board, and first and second opposed lateral walls projecting from the lid wall to the circuit board and extending between the base wall and the rear wall, the lid wall, the rear wall, and the first and second lateral walls defining a protection wall configured to cover the first and second projecting portions from an upper side, opposite lateral sides and a rear side with clearances formed between the protection wall and both the first and second projecting portions, the receptacle of the connector housing further including a forwardly open surrounding wall having a locking recess formed on an inwardly facing surface of an upper part of the surrounding wall, the locking recess being spaced from front and rear ends of the surrounding wall of the receptacle and spaced from opposite sides of the surrounding wall.

4. An electrical connection box, comprising an upper case with an open lower side, a lower case for closing an opening of the upper case and a circuit board to be accommodated in an accommodation space formed by the upper case and the lower case in a state where the upper case and the lower case are assembled, wherein:
the upper case is integrally formed with a connector in which a substantially L-shaped terminal fitting is mounted in a connector housing including a receptacle with an open front side;
a front end part of the terminal fitting is arranged in the receptacle and a rear end part thereof is connected to a conductive path formed on the circuit board, and an intermediate part is molded integrally into a base wall of the receptacle;
the terminal fitting further includes a first projecting portion projecting backward from a base wall of the receptacle and a second projecting portion bent downward substantially at a right angle from an end of the first projecting portion and extending to the rear end part that is connected to the circuit board; and
the connector housing is integrally formed with a lid wall extending backward from the base wall of the receptacle, a rear wall spaced from the base wall and projecting from the lid wall to the circuit board, and first and second opposed lateral walls projecting from the lid wall to the circuit board and extending between the base wall and the rear wall, the lid wall, the rear wall, and the first and second lateral walls defining a protection wall configured to cover the first and second projecting portions from an upper side, opposite lateral sides and a rear side with clearances formed between the protection wall and both the first and second projecting portions, the receptacle of the connector housing further including a forwardly open surrounding wall having a locking recess formed on an inwardly facing surface of an upper part of the surrounding wall, the locking recess being spaced from front and rear ends of the surrounding wall of the receptacle and spaced from opposite sides of the surrounding wall.

5. The electrical connection box of claim 4, wherein the protection wall forms a part of a wall portion of the upper case.

* * * * *